(12) United States Patent
Aneja et al.

(10) Patent No.: US 6,911,986 B1
(45) Date of Patent: Jun. 28, 2005

(54) METHOD AND SYSTEM FOR PROCESSING VIDEO INCORPORATING MULTIPLE ON SCREEN DISPLAY FORMATS

(75) Inventors: Charu Aneja, Indianapolis, IN (US); Mario Lazaga, VS-Villingen (DE); Aaron Hal Dinwiddie, Fishers, IN (US)

(73) Assignee: Thomson Licensing S.A., Billancourt (FR)

( * ) Notice: Subject to any disclaimer, the term of this patent is extended or adjusted under 35 U.S.C. 154(b) by 376 days.

(21) Appl. No.: 09/592,204

(22) Filed: Jun. 13, 2000

Related U.S. Application Data

(60) Provisional application No. 60/143,610, filed on Jul. 13, 1999.

(51) Int. Cl.[7] ............................................... G09G 5/36
(52) U.S. Cl. ......................................... 345/545; 345/632
(58) Field of Search ............................... 345/545, 632, 345/543, 765, 763, 700, 569, 764; 348/569, 589; 709/246

(56) References Cited

U.S. PATENT DOCUMENTS

| | | | |
|---|---|---|---|
| 4,477,830 A | 10/1984 | Lindman et al. ............ 358/1 |
| 4,792,936 A | 12/1988 | Picard ......................... 369/59 |
| 5,020,003 A | * 5/1991 | Moshenberg ............... 345/543 |
| 5,420,605 A | 5/1995 | Vouri et al. ................. 345/132 |
| 5,489,947 A | * 2/1996 | Cooper ....................... 348/589 |
| 5,534,942 A | 7/1996 | Beyers, Jr. et al. ......... 348/569 |
| 5,640,502 A | 6/1997 | Knox et al. ................. 395/507 |
| 5,745,095 A | 4/1998 | Parchem et al. ............ 345/114 |
| 6,002,835 A | 12/1999 | Watanabe .................... 386/95 |
| 6,462,746 B1 | * 10/2002 | Min et al. ................... 345/545 |

* cited by examiner

Primary Examiner—Matthew C. Bella
Assistant Examiner—Dalip K. Singh
(74) Attorney, Agent, or Firm—Joseph S. Tripoli; Ronald H. Kurdyla; Vincent E. Duffy

(57) ABSTRACT

A data format employing multiple different headers associated with corresponding OSD content facilitates the implementation of an efficient and flexible OSD management and control system. Each header contains a unique display characteristic or set of display characteristics for the interpretation and presentation of an associated OSD pixel map. In using this system, the presentation or modification of an OSD involves the selection of the header, associated with the OSD, having the desired display characteristics to be used in presenting or modifying the OSD.

21 Claims, 8 Drawing Sheets

METHOD AND SYSTEM FOR PROCESSING VIDEO INCORPORATING MULTIPLE ON SCREEN DISPLAY FORMATS

RELATED APPLICATIONS

This is a Non-Provisional Application of Provisional Application Ser. No. 60/143,610 by Aneja et al, filed Jul. 13, 1999.

FIELD OF THE INVENTION

The present invention relates to video data processing.

BACKGROUND OF THE INVENTION

Home entertainment systems which combine Personal Computer and television functions (PC/TV systems), are increasingly becoming generic user-interactive multiple-source and multiple-destination communication devices. Such multimedia systems are required to communicate in different data formats between multiple locations for a variety of applications in response to user requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g., the Internet) and coaxial lines (e.g., cable TV) as well as from both remote and local sources such as Digital Video Disk (DVD), CDROM, VHS and Digital VHS (DVHS™) type players, and PCs.

Such a generic PC/TV entertainment system requires a variety of different On Screen Displays (OSDs) for use with video program content from different sources or for different applications. The processing of multiple different OSDs in television and multimedia systems is constrained by time, memory size, and other practical limitations. A system according to the present invention provides an OSD management and control system that efficiently accommodates the data processing constraints.

SUMMARY OF THE INVENTION

A data format employing multiple different headers associated with corresponding OSD content facilitates the implementation of an efficient and flexible OSD management and control system. Each header contains a unique display characteristic or set of display characteristics for the interpretation and presentation of an associated OSD pixel map. In using this system, the presentation or modification of an OSD involves the selection of the header, associated with the OSD, having the desired display characteristics to be used in presenting or modifying the OSD.

DETAILED DESCRIPTION OF THE PREFERRED EMBODIMENT

The characteristics and advantages of the present invention will become more apparent from the following description, given by way of example.

Figure 1:
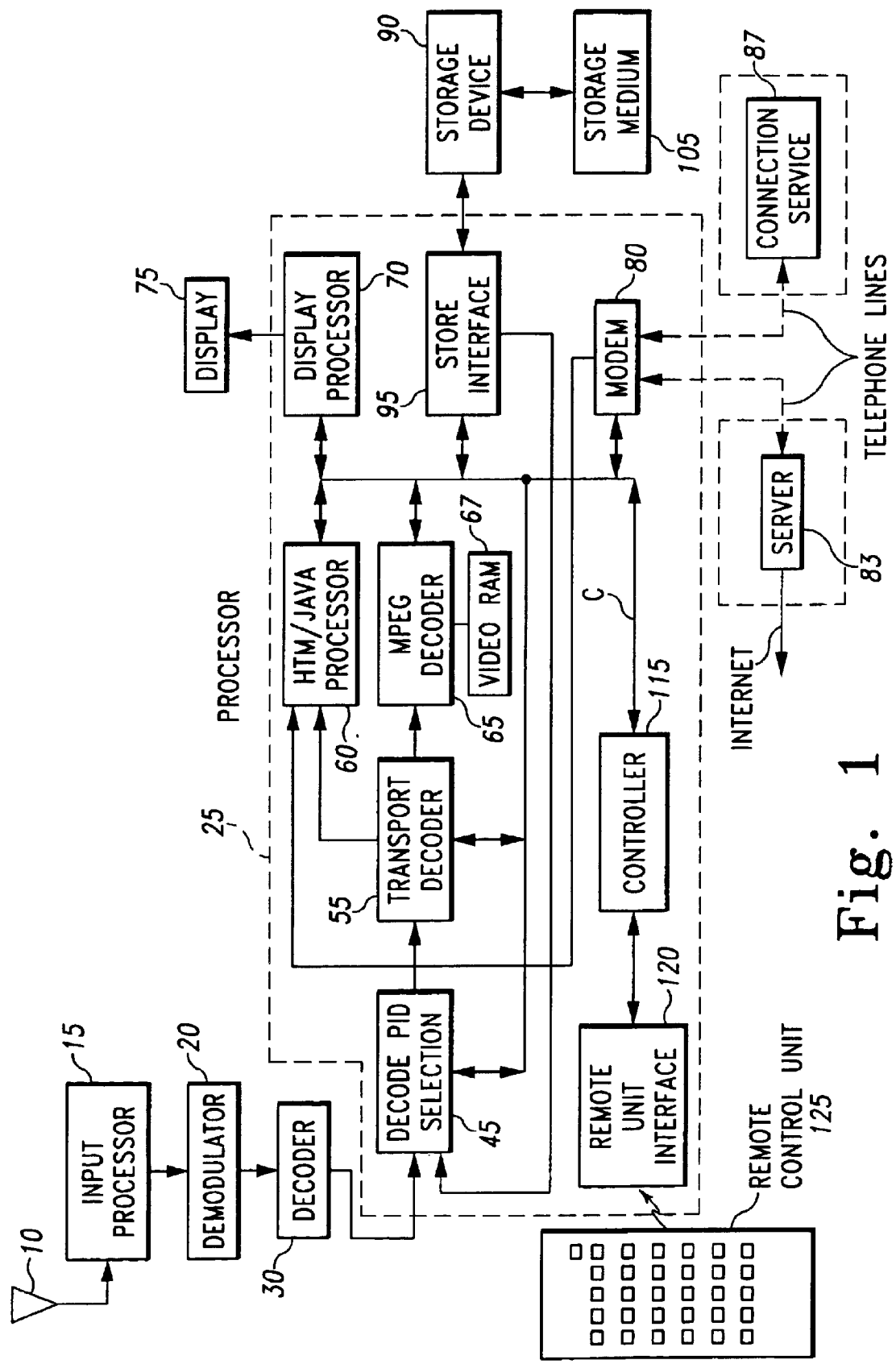
FIG. 1 shows an exemplary home entertainment system for processing OSD header and content data according to the present invention.

Referring now to FIG. 1, a block diagram of an exemplary digital video receiving system that operates according to the principles of the invention is shown. The video receiver system includes an antenna 10 and input processor 15 for receiving and digitizing a broadcast carrier modulated with signals carrying audio, video, and associated data, a demodulator 20 for receiving and demodulating the digital output signal from input processor 15, and a decoder 30 outputting a signal that is trellis decoded, mapped into byte length data segments, de-interleaved, and Reed-Solomon error corrected. The corrected output data from decoder unit 30 is in the form of an MPEG compatible transport datastream containing program representative multiplexed audio, video, and data components.

The video receiver system further includes a modem 80 that may be connected, via telephone lines, to a server 83 or connection service 87 such that data in various formats (e.g., MPEG, HTML, and/or JAVA) can be received by the video receiver system over the telephone lines.

A processor 25 processes the data output from decoder 30 and/or modem 80 such that the processed data can be displayed on a display unit 75 or stored on a storage medium 105 in accordance with requests input by a user via a remote control unit 125. More specifically, processor 25 includes a controller 115 that interprets requests received from remote control unit 125 via remote unit interface 120 and appropriately configures the elements of processor 25 to carry out user requests (e.g., channel, website, and/or OSD display). In one exemplary mode, controller 115 configures the elements of processor 25 to provide MPEG decoded data and an OSD for display on display unit 75. In another exemplary mode, controller 15 configures the elements of processor 25 to provide an MPEG compatible datastream for storage on storage medium 105 via storage device 90 and store interface 95. In a further exemplary mode, controller 115 configures the elements of processor 25 for other communication modes, such as for receiving bidirectional (e.g. Internet) communications via server 83 or connection service 87.

Processor 25 includes a decode PID selection unit 45 that identifies and routes selected packets in the transport stream from decoder 30 to transport decoder 55. The transport stream from decoder 30 is demultiplexed into audio, video, and data components by transport decoder 55 and is further processed by the other elements of processor 25, as described in further detail below.

The transport stream provided to processor 25 comprises data packets containing program channel data, ancillary system timing information, and program specific information such as program content rating and program guide information. Transport decoder 55 directs the ancillary information packets to controller 115 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. Further, the program specific information contains conditional access, network information, and identification and linking data enabling the system of FIG. 1 to tune to a desired channel and assemble data packets to form complete programs. The program specific information also contains ancillary program content rating information (e.g., an age based suitability rating), program guide information (e.g., an Electronic Program Guide—EPG) and descriptive text related to the broadcast programs as well as data supporting the identification and assembly of this ancillary information.

Transport decoder 55 provides MPEG compatible video, audio, and sub-picture streams to MPEG decoder 65. The video and audio streams contain compressed video and audio data representing the selected channel program content. The sub-picture data contains information associated with the channel program content such as rating information, program description information, and the like.

MPEG decoder 65 cooperates with a random access memory (RAM) 67 to decode and decompress the MPEG compatible packetized audio and video data from unit 55 and provides decompressed program representative pixel data to display processor 70. Decoder 65 also assembles, collates and interprets the sub-picture data from unit 55 to produce formatted program guide data for output to an internal OSD module (See FIGS. 2, 3, and 6). The OSD module cooperate with RAM 67 to process the sub-picture data and other information to generate pixel mapped data representing subtitling, control, and information menu displays including selectable menu options and other items for presentation on display device 75 in accordance with the present invention. The control and information menus that are displayed enable a user to select a program to view and to schedule future program processing functions including tuning to receive a selected program for viewing, recording of a program onto storage medium 105, and playback of a program from medium 105.

The control and information displays, including text and graphics produced by the OSD module, are generated in the form of overlay pixel map data under direction of controller 115. The overlay pixel map data from the OSD module is combined and synchronized with the decompressed pixel representative data from MPEG decoder 65 under direction of controller 115. Combined pixel map data representing a video program on the selected channel together with associated sub-picture data is encoded by display processor 70 and output to device 75 for display.

The principles of the invention may be applied to terrestrial, cable, satellite, Internet or computer network broadcast systems in which the coding type or modulation format may be varied. Such systems may include, for example, non-MPEG compatible systems, involving other types of encoded datastreams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

The architecture of FIG. 1 is not exclusive. Other architectures may be derived in accordance with the principles of the invention to accomplish the same objectives. Further, the functions of the elements of processor 25 of FIG. 1 may be implemented in whole or in part within the programmed instructions of a microprocessor. In addition, the principles of the invention apply to any form of MPEG or non-MPEG compatible electronic program guide.

Figure 2:
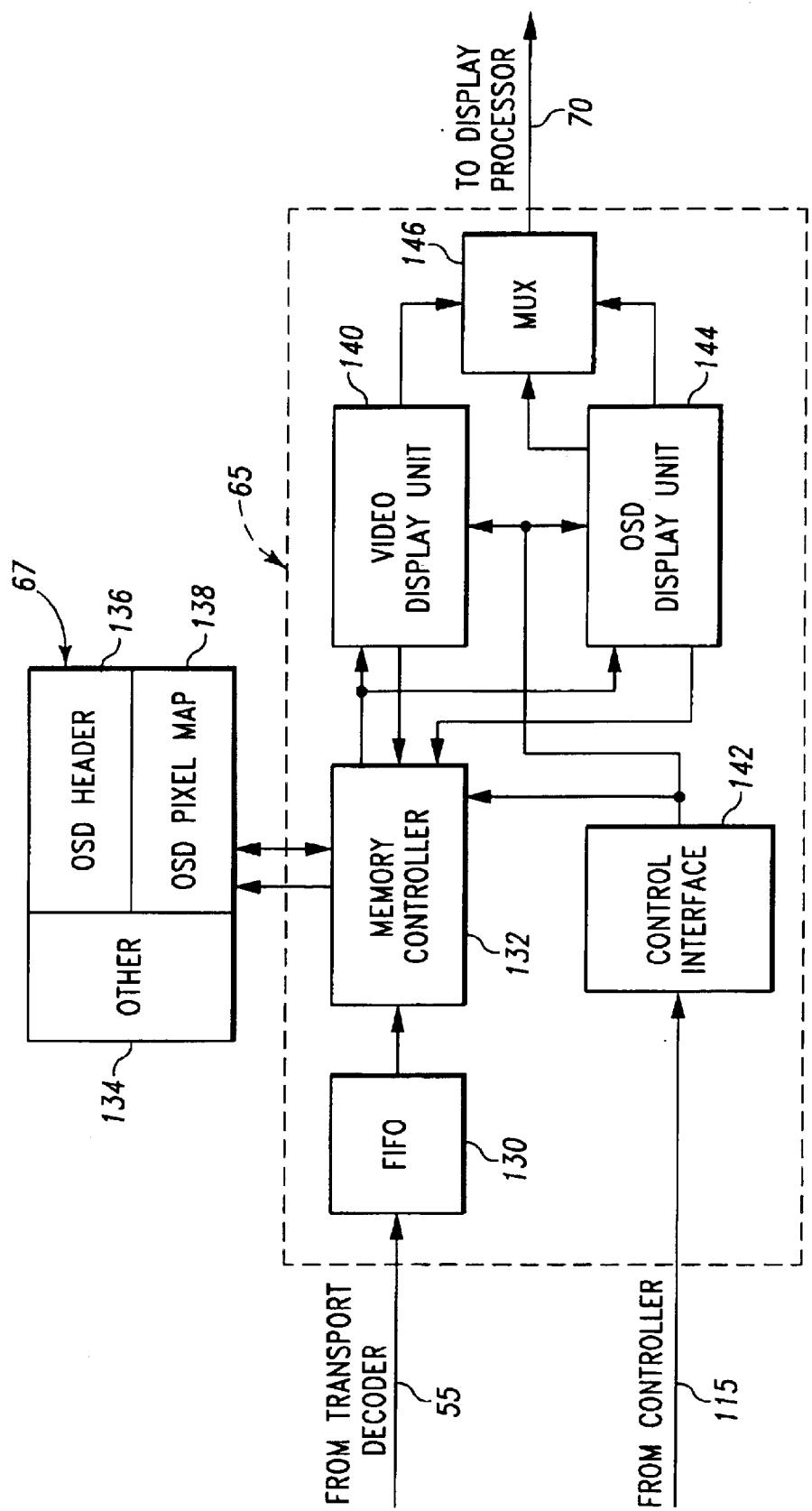
FIG. 2 further illustrates the MPEG decoder and video memory of the exemplary home entertainment decoder system shown in FIG. 1.

Referring now to FIG. 2, MPEG decoder 65 and video RAM 67 are illustrated in further detail. Decoder 65 includes a FIFO buffer memory 130 which receives video data packets on demand in small segments from transport decoder 55 and couples them into relatively larger segments via a memory controller 132 to a section 134 of RAM 67 reserved for decoding and decompression. Video RAM 67 is addressed under the control of memory controller 132. Section 134 of RAM 67 includes a rate buffer section for storing the received video data packets and a frame store section for storing frames of video information during the decoding and decompression operation. A video display unit 140 decodes and decompresses the stored video data packets to form a sequence of video image components. For this purpose, video display unit 140 requests data from the decoding and decompression portion of section 134 via memory controller 132 as required. The sequence of video image components are synchronized with field, line, and pixel rate signals generated by display processor 70. Control data generated by controller 115 is received by controller interface unit 142 and coupled to various elements of MPEG decoder 65 via an internal control bus.

The OSD portion of MPEG decoder 65 includes an OSD display unit 144 which communicates with an OSD header memory block 136 and an OSD pixel map or bitmap memory block 138 of RAM 67 via memory controller 132, as discussed in further detail below. Upon initialization of the video receiver, controller 115 generates a plurality of pixel maps and associated pixel map headers and stores them in OSD pixel map and OSD header blocks of memory 138 and 136 via control interface 142 and memory controller 132.

An output multiplexer 146, under the control of OSD display unit 144, combines the output of video display unit 140 (video image components) and the output of OSD display unit 144 (graphic image components) and passes the video and graphical combination to display processor 70 for display on display unit 75.

Figure 3:
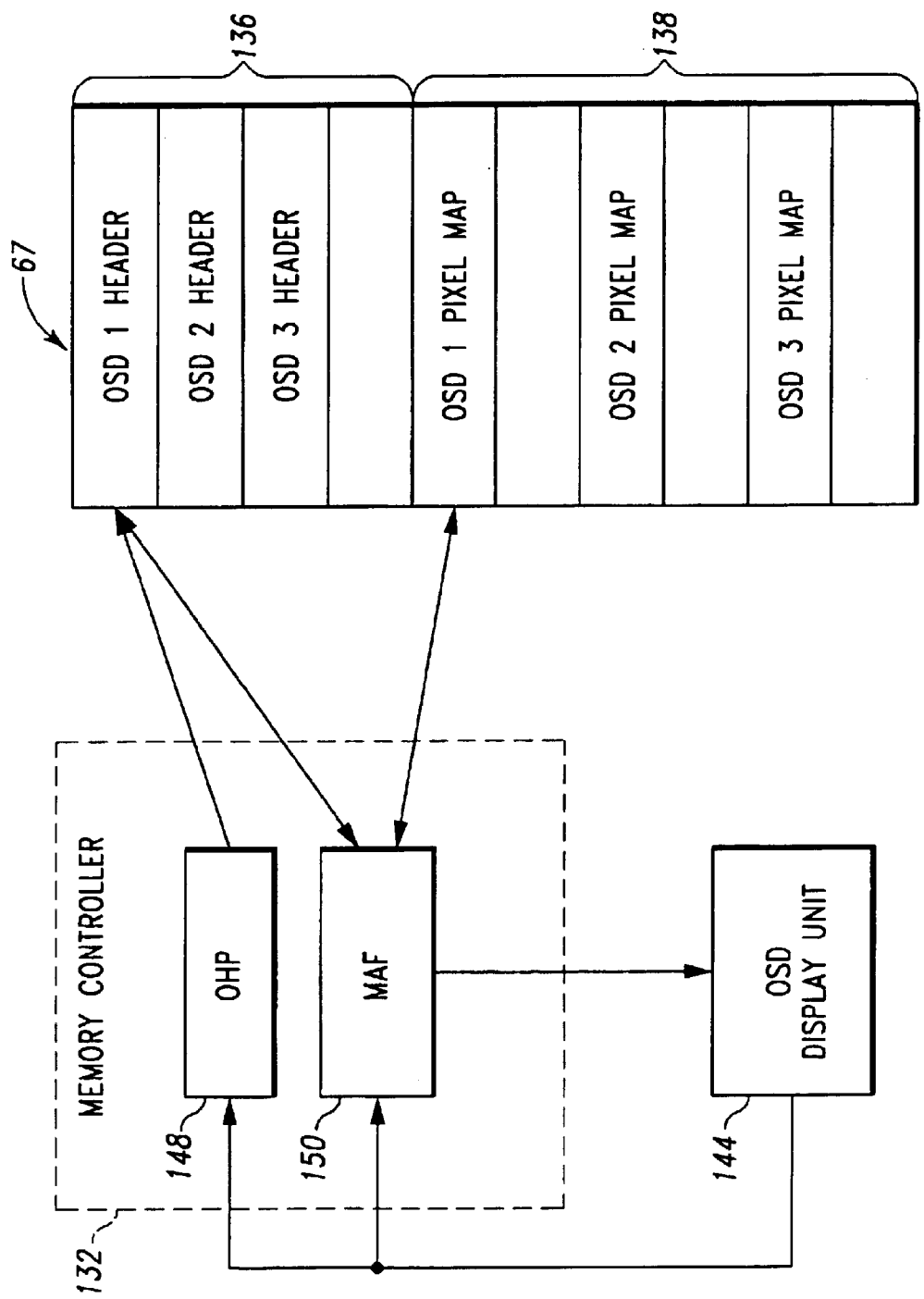
FIG. 3 illustrates a conventional MPEG decoder and video memory arrangement.
Figure 5:
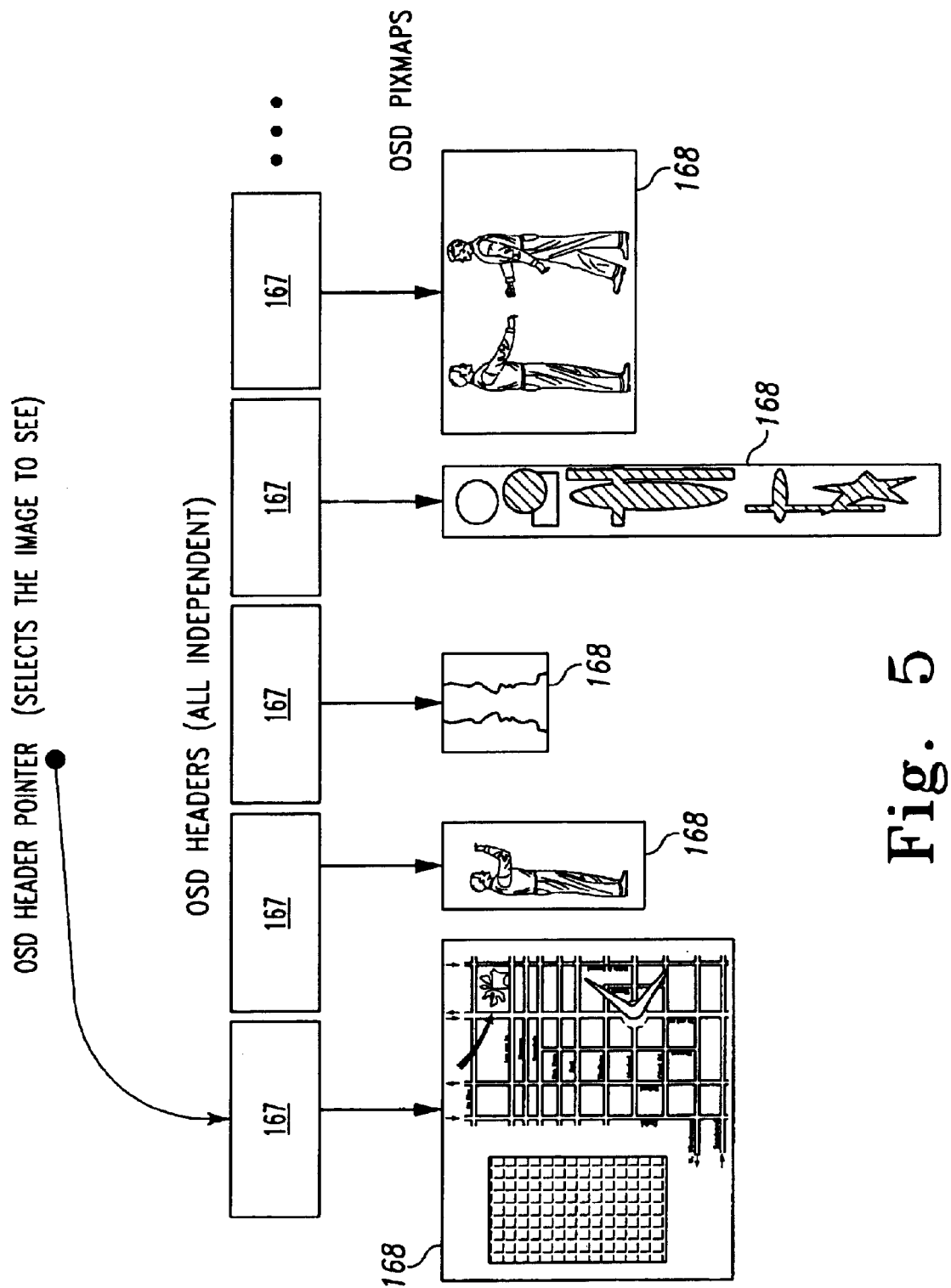
FIG. 5 illustrates conventional OSD data formats.

Referring now to FIG. 3, a conventional OSD management and control arrangement is shown. Memory controller 132 includes, inter alia, an OSD header pointer (OHP) register 148 and a memory access file (MAF) register 150 for facilitating the storage and retrieval of OSD data in OSD header block 136 and OSD pixel map block 138 of memory 67. Memory controller 132 manages the storage and retrieval of OSD data in memory 67 in response to requests from OSD display unit 144. Upon initialization of the video receiver, a plurality of OSD data structures are stored in memory 67. Each OSD data structure includes an OSD header (e.g., "OSD1", "OSD2", and "OSD3" headers) stored in header block 136 of memory 67 and an OSD pixel map (e.g., "OSD1", "OSD2", and "OSD3" pixel maps) stored in pixel map block 138 of memory 67. In accordance with the conventional OSD buffering technique, there is a single OSD header stored in header block 136 for each OSD pixel map stored in pixel map block 138. Each OSD header contains the memory location of the associated pixel map in pixel map block 138 as well as a set of display characteristics that define how the associated pixel map is to be processed by display processor 70 and displayed on display unit 75. For example, the "OSD1" header contains the memory location of the "OSD1" pixel map as well as a set of display characteristics defining how the "OSD1" pixel map is to be processed and displayed. The display characteristics include, but are not limited to, the presence or absence of OSD side panels, the use of pixel compression, the number of bits per pixel, YUV or YIQ colorimetry, degree of transparency, OSD size, OSD format (e.g., interlaced or progressive), OSD color scheme, OSD blending ratio, OSD resolution, aspect ratio, horizontal pixel duplication, vertical pixel duplication, OSD screen location. Some exemplary OSD header and OSD pixel map data structures are illustrated in FIG. 5. As discussed above, each OSD header 167 is associated with a different OSD pixel map 168.

Figure 4:
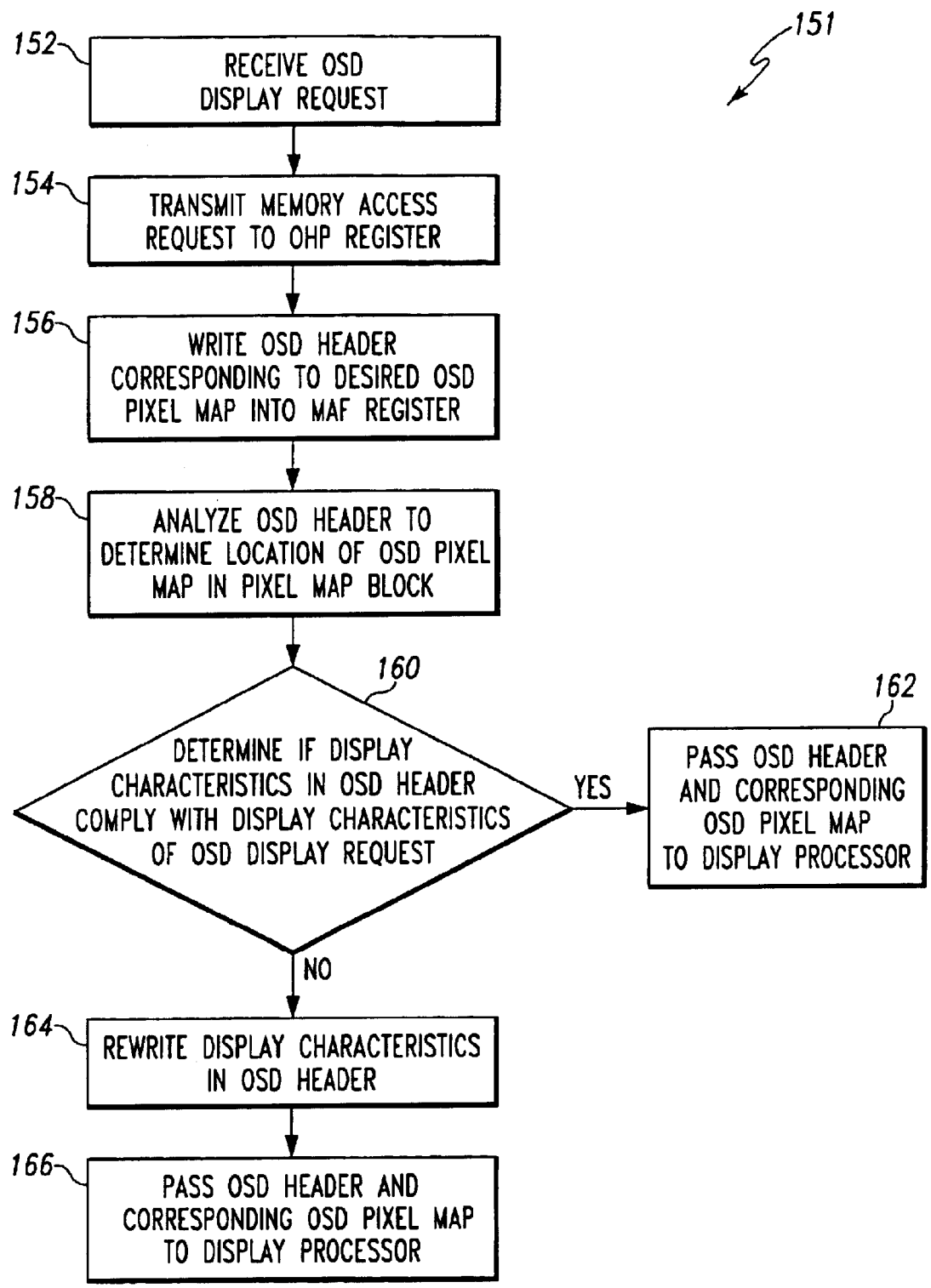
FIG. 4 is a flowchart illustrating a conventional OSD retrieval process.

Referring now to FIG. 4, in conjunction with FIG. 3, a conventional OSD retrieval process 151 is shown. Initially, OSD display unit 144, at step 152, receives an OSD display request from controller 115 to display an OSD (e.g., a graphical image as shown in FIG. 5) on display unit 75. In response to the controller's request, OSD display unit 144, at step 154, transmits a memory access request to OHP register 148. OHP register 148 services the request, at step 156, by writing the OSD header corresponding to the desired OSD pixel map into MAF register 150. OSD display unit 144, at step 158, reads the OSD header to determine the location of the OSD pixel map in pixel map block 138. Once the pixel map location is determined, OSD display unit 144 sets the OSD address in memory controller 132 and requests that memory controller 132 read the image at the set address into MAF register 150. Afterwards, OSD display unit 144, at step 160, determines if the display characteristics in the retrieved OSD header comply with the display characteristics of the OSD display request. For example, the display characteristics of the retrieved header may indicate that the associated pixel map is to be displayed as a blue image in an upper portion of display 75 while the requested display characteristics are for the associated pixel map to be displayed as a green image in a lower portion of display 75. If the display characteristics of the OSD header comply with the requested OSD display characteristics, OSD display unit 144, at step 162, passes the OSD pixel map and the associated display characteristics (as provided in the OSD header) to display processor 70. If the display characteristics of the OSD header do not comply with the requested OSD display characteristics, OSD display unit 144, at step 164, rewrites the display characteristics in the retrieved OSD header and/or redraws the OSD pixel map to contain the requested display characteristics before passing, at step 166, the OSD pixel map (as redrawn) and associated and/or redrawing of the OSD pixel map results in a delay between the OSD request from controller 115 and the display of the OSD having the desired display characteristics. In other words, the multiple memory instructions required to modify the OSD header and associated OSD pixel map results in a delay in the display of the OSD. It should be noted that if the OSD display request occurs when the video receiver is involved in a time critical process (e.g., the display of a video program), a delay in the display of the OSD may result in a disruption or distortion of the video (e.g., the introduction of video anomalies) being displayed to a user.

Figure 6:
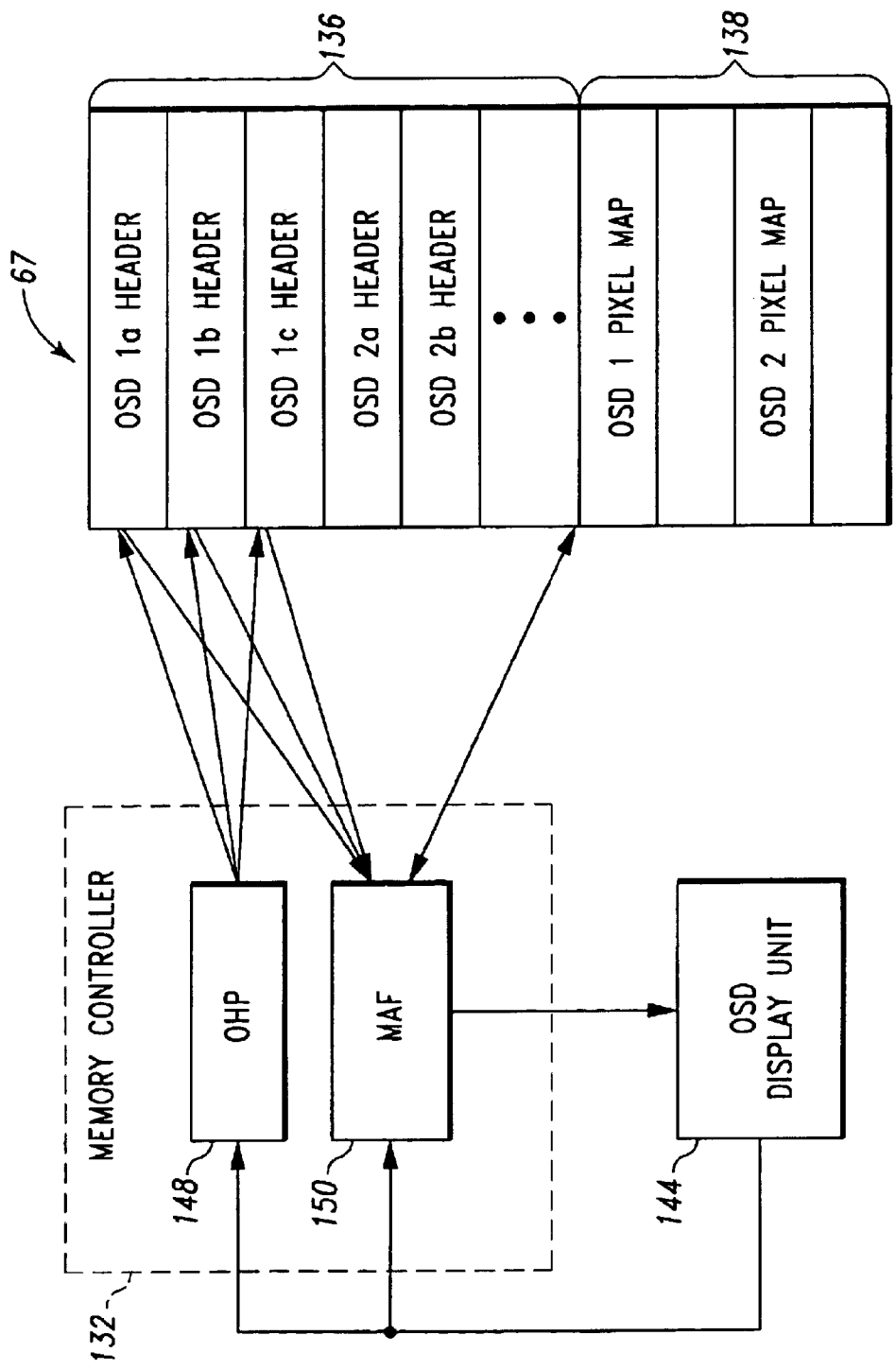
FIG. 6 illustrates an MPEG decoder and video memory arrangement of the present invention.
Figure 8:
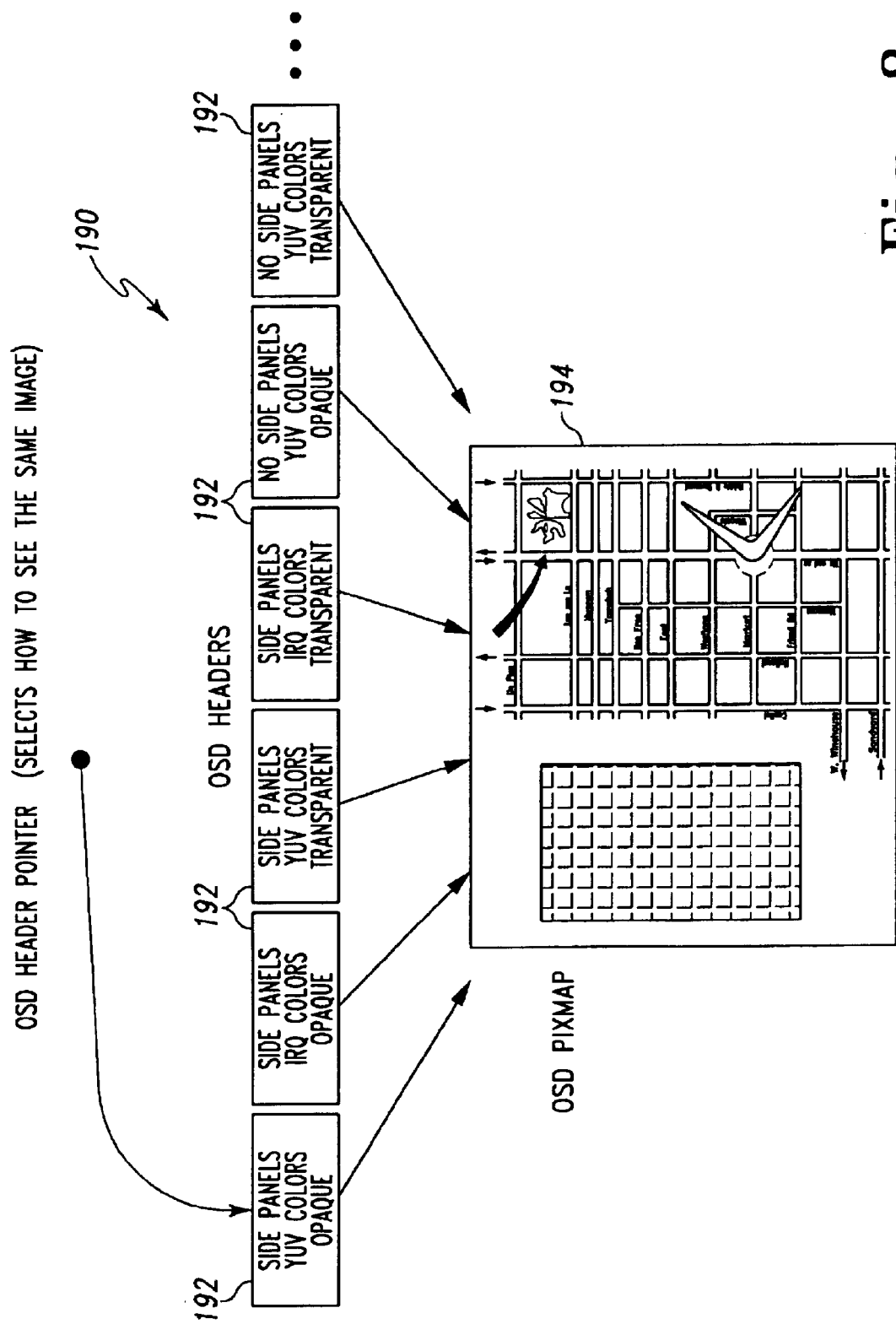
FIG. 8 illustrates the OSD data format of the present invention.

Referring now to FIG. 6, an improved OSD management and control arrangement of the present invention is illustrated. The improved OSD management and control arrangement of the present invention greatly reduces the delay that would otherwise be encountered using the conventional OSD management and control arrangement of FIG. 3. In accordance with the arrangement of the present invention, a plurality of OSD data structures are stored in memory 67 upon initialization of the video receiver. More specifically, each OSD data structure of the present invention includes an OSD pixel map stored in pixel map block 138 of memory 67 and a plurality of associated OSD headers stored in header block 136 of memory 67. Thus, in accordance with the OSD buffering technique of the present invention, there are a plurality of OSD headers (e.g., "OSD1a", "OSD1b", and "OSD1c" headers) stored in header block 136 for each OSD pixel map (e.g., "OSD1" pixel map) stored in pixel map block 138. Each OSD header contains the memory location of the associated OSD pixel map and a unique display characteristic or set of display characteristics defining how the OSD pixel map is to be displayed on display unit 75. An exemplary multiple OSD header 192 and single OSD pixel map 194 data structure 190 is illustrated in FIG. 8.

Figure 7:
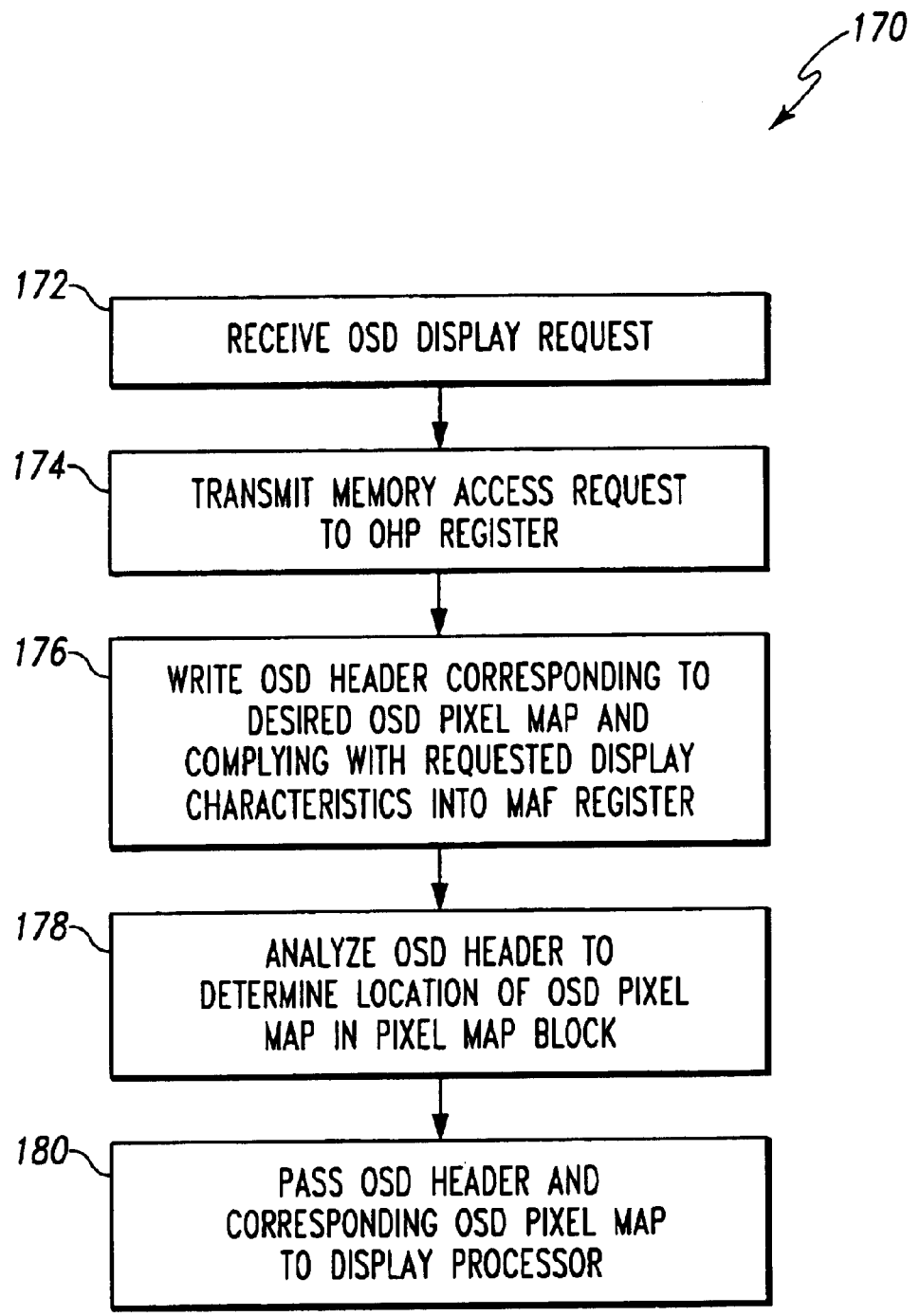
FIG. 7 is a flowchart illustrating the OSD retrieval process of the present invention.

Referring now to FIG. 7, in conjunction with FIG. 6, an OSD retrieval process 170 of the present invention is shown. Initially, OSD display unit 144, at step 172, receives an OSD display request from controller 115. In response to the controller's request, OSD display unit 144, at step 174, transmits a memory access request to OHP register 148. OHP register 148 services the request, at step 176, by writing the OSD header corresponding to the desired OSD bitmap and complying with the requested display characteristics into MAF register 150. OSD display unit 178, at step 158, reads the OSD header to determine the location of the OSD pixel map in pixel map block 138. Once the pixel map location is determined, OSD display unit 144 sets the OSD address in memory controller 132 and requests that memory controller 132 read the image at the set address into MAF register 150. Afterwards, OSD display unit 144, at step 180, passes the OSD pixel map and the associated display characteristics (as provided in the OSD header) to display processor 70. It should be noted that there is no rewriting of the OSD header or redrawing of the OSD pixel map since multiple headers for each pixel map are provided. Preferably, there are as many headers as there are combinations of display characteristics for the associated pixel map. Thus, an OSD may be retrieved from memory 76 using a single memory instruction from OSD display unit 144 (as opposed to the multiple instructions that would otherwise be required for the retrieval and rewriting of an OSD header having incorrect display characteristics). Moreover, providing a plurality of headers (with each header having a unique display characteristic or set of display characteristics) for each pixel map facilitates efficient OSD selection, OSD modification, and OSD display without a rewriting and/or redrawing delay.

While the present invention has been described with reference to the preferred embodiments, it is apparent that that various changes may be made in the embodiments without departing from the spirit and the scope of the invention, as defined by the appended claims.

What is claimed is:

1. A method for processing image data for display, the method comprising the steps of:

storing a pixel map in a memory at a memory location;

storing a plurality of different headers associated with the pixel map in the memory, each header containing the same memory location of the pixel map and a unique display characteristic; and selecting a header defining a desired display characteristic for the pixel map.

2. The method of claim 1, further comprising the step of: processing the selected header and associated pixel map to generate an image in a displayable format.

3. The method according to claim 1, wherein the pixel map is associated with an on-screen display (OSD) data structure.

4. The method of claim 1, wherein the desired display characteristic is at least one of a presence or absence of a side panel, a YUV or YIQ colorimetry, a degree of transparency, an image size, an interlaced or progressive display format, a color scheme, an aspect ratio, a blending ratio, a resolution factor, a number of bits per pixel, a compression factor, a horizontal pixel duplication value, and a vertical pixel duplication value.

5. A method of generating an image for display on a display unit, the method comprising the steps of:
receiving a request to display an image having a desired display characteristic;
accessing an image data structure stored in a memory in response to the received request, the image data structure including an image block containing image data and a plurality of associated header blocks, each header block containing the same memory location of the image block and a unique image display characteristic;
selecting a header block having a unique display characteristic that corresponds to the desired display characteristic; and
processing the selected header block and the associated image block such that the image having the desired characteristic is displayed.

6. The method of claim 5, wherein the image is an on-screen display.

7. The method of claim 5, wherein the display characteristic is at least one of a presence or absence of a side panel, a YUV or YIQ colorimetry, a degree of transparency, an image size, an interlaced or progressive display format, a color scheme, an aspect ratio, a blending ratio, a resolution factor, a number of bits per pixel, a compression factor, a horizontal pixel duplication value, and a vertical pixel duplication value.

8. The method of claim 5 wherein the display characteristic is a unique set of display characteristics.

9. The method of claim 5, further including the step of: storing the data structure in the memory prior to the receipt of the image display request.

10. The method of claim 5, wherein the image data structure is one of a plurality of image data structures stored in the memory.

11. The method of claim 5, wherein the image data in the image block of the image data structure is a pixel map.

12. In a system for the reception, processing, and display of video and graphical data, a method of generating an on-screen display:
storing a data structure in a memory at a memory location upon an initialization of the system, the data structure including on-screen display content data and a plurality of headers associated with the on-screen display content data, each header containing the same memory location of the on-screen display content data and a distinct set of processing instructions for the processing of the on-screen display content data;
receiving a request to display an on-screen display corresponding to the stored data structure, the request indicating that the on-screen display is to be displayed in accordance with a selected format;
retrieving the on-screen display content data and a header of the plurality of headers from the memory in response to the received request, the retrieved header containing a distinct set of processing instructions that correspond to the selected format; and
processing the retrieved on-screen display content data in accordance with the distinct set of processing instructions of the retrieved header to generate the on-screen display in the selected format.

13. The method of claim 12, wherein the distinct set of processing instructions includes an instruction for at least one of a presence or absence of a side panel, a YUV or YIQ colorimetry, a degree of transparency, an image size, an interlaced or progressive display format, a color scheme, an aspect ratio, a blending ratio, a resolution factor, a number of bits per pixel, a compression factor, a horizontal pixel duplication value, and a vertical pixel duplication value.

14. The method of claim 12, wherein the on-screen display content data is a pixel map.

15. A system for generating an image, the system comprising:
an input coupled to a source of image requests, each image request containing a desired image and desired image characteristic;
a memory for storing a plurality of image data structures, each image data structure including an image segment and a plurality of associated header segments, each header segment including the same memory location of the image segment and a unique image characteristic;
a controller coupled to the input and the memory, the controller accessing an image data structure of the plurality of image data structures in response to an image request received from the input, the controller accessing the image data structure such that the image segment corresponding to the desired image and the associated header segment corresponding to the desired image characteristic are retrieved from the memory; and
processing circuitry coupled to the controller for receiving the retrieved image segment and header segment from the controller and processing the image segment in accordance with the header segment to generate an image corresponding to the image request.

16. The system of claim 15, further comprising:
a display unit coupled to the processing circuitry for displaying the image generated by the processing circuitry.

17. The system of claim 15, wherein the image segment is a pixel map.

18. The system of claim 15, wherein the unique image characteristic is at least one of a presence or absence of a side panel, a YUV or YIQ colorimetry, a degree of transparency, an image size, an interlaced or progressive display format, a color scheme, an aspect ratio, a blending ratio, a resolution factor, a number of bits per pixel, a compression factor, a horizontal pixel duplication value, and a vertical pixel duplication value.

19. The system of claim 15, wherein the image corresponding to the image request is an on-screen display.

20. The system of claim 15, wherein the unique image characteristic is a unique set of image characteristics.

21. An on-screen display memory comprising:
a first region containing a pixel map;
a second region containing a plurality of different headers, each header containing the same memory location of the pixel map and defining a different display characteristic for the pixel map; and
a control port for selecting a desired one of the different headers.

* * * * *